Nov. 3, 1970 — B. M. BEST — 3,537,337
GUN JIG
Filed Nov. 12, 1968 — 2 Sheets-Sheet 1
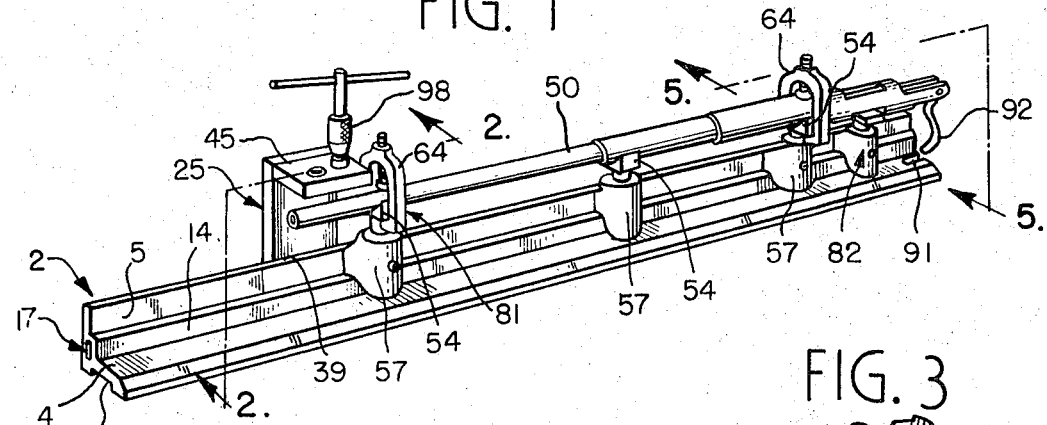
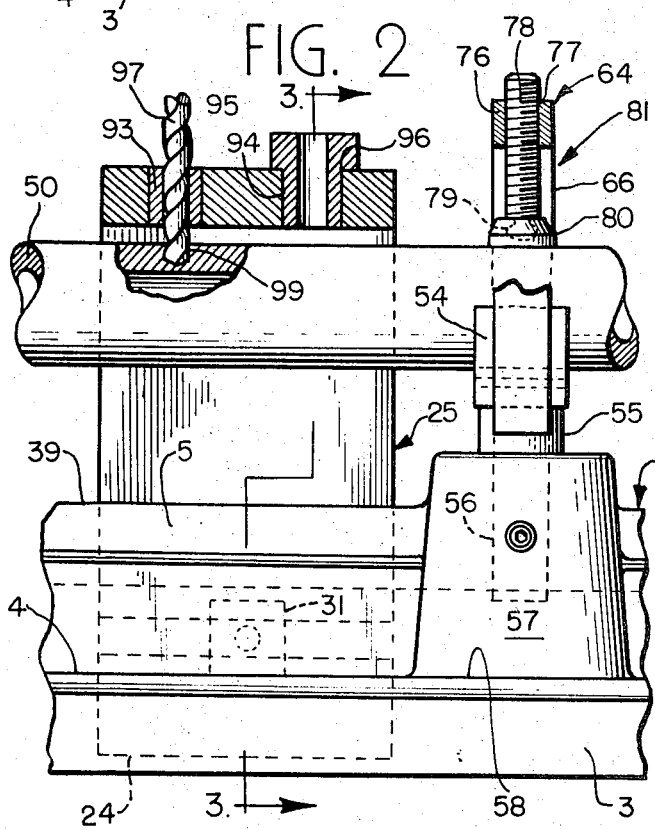
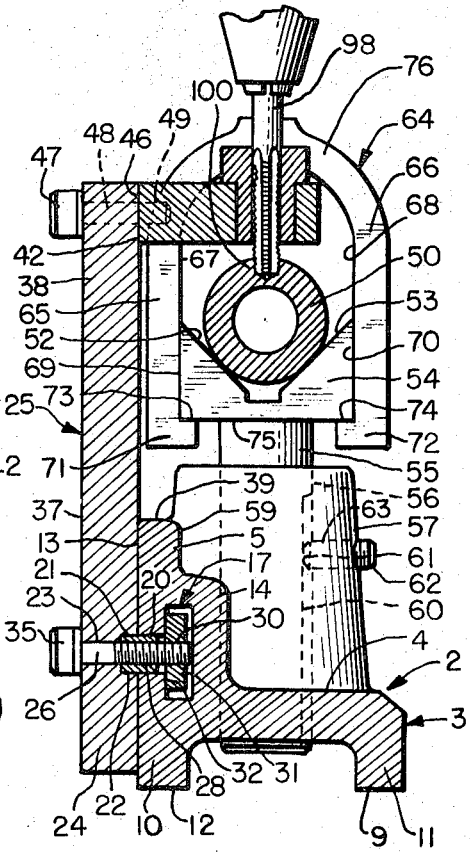
Inventor
Billy M. Best
By John J. Kowalik
Attorney Nov. 3, 1970   B. M. BEST   3,537,337
GUN JIG
Filed Nov. 12, 1968   2 Sheets-Sheet 2

Inventor
Billy M. Best

By *John J. Kowalik*
Attorney

United States Patent Office

3,537,337
Patented Nov. 3, 1970

3,537,337
GUN JIG
Billy M. Best, 3639 Merritt St., Memphis, Tenn. 38128
Filed Nov. 12, 1968, Ser. No. 774,800
Int. Cl. B25b 1/20
U.S. Cl. 77—62                                            10 Claims

ABSTRACT OF THE DISCLOSURE

A jig for mounting scopes and sight ramps on various rifles comprising a base having a flat, adjustable reference support for engagement with a flat bottom reference surface of the selected gun barrel at the action thereof, a plurality of adjustable supports on the base spaced lengthwise of the gun barrel and cradling the barrel at a plurality of points to support the barrel in a position holding the reference surface flat against the reference support surface, and a drill and tap guide having a standard portion extending from a side of the base normal to said reference surfaces and having an overhanging template portion selected for the gun barrel to be worked on extending from the standard parallel to the reference surfaces and having guide apertures vertically aligned with the barrel for accurately positioning a drill or tap to the barrel.

DISCUSSION OF THE PRIOR ART

A gunsmith's jig must be accurate and easily usable. The prior art required the skill of the gunsmith and various make-shift devices for doing the work. These are tedious to use and time consuming and the accuracy of the work is determined by the skill of the user. This is particularly true in mounting the sight ramps and the scope to a rifle. The accuracy of the mounting of the sights to the bore is essential for accuracy of the weapon.

SUMMARY OF THE INVENTION

This invention pertains to a jig which will accurately mount a gun barrel in association with a plurality of adjustable supports which will firmly and accurately hold such gun barrel for work thereon.

A general object of the invention is to provide a jig which is easy to use and which will universally fit various types of guns.

Another object of the invention is to provide a jig having a base which is adapted to lie flat upon a worktable and wherein a plurality of hollow bosses extend upwardly from the base and mount adjustable cradle supports for the gun barrel to place it horizontally in position for drilling.

Another object is to provide in the apparatus described a combination clamp and gun barrel mount for holding the barrel from shifting.

A still further object is to provide a jig which utilizes the flat surfaces on the gun barrel at the bottom of the action as a reference for mounting the gun on the jig.

A still further object is to provide in such a jig a support for the drilling template which is adjustable longitudinally of the gun barrel and wherein the support is formed and arranged to mount a plurality of different templates for different guns.

These and other objects and advantages inherent in and encompassed by the invention will become more readily apparent from the specifications and the drawings, wherein:

FIG. 1 is a perspective view of my novel jig with a gun barrel mounted thereon;

FIG. 2 is an enlarged longitudinal sectional view taken essentially on line 2—2 of FIG. 1;

FIG. 3 is a cross-sectional view taken substantially on line 3—3 of FIG. 2;

FIG. 4 is a plan view partly in section of the template and support therefor;

Figure 5:
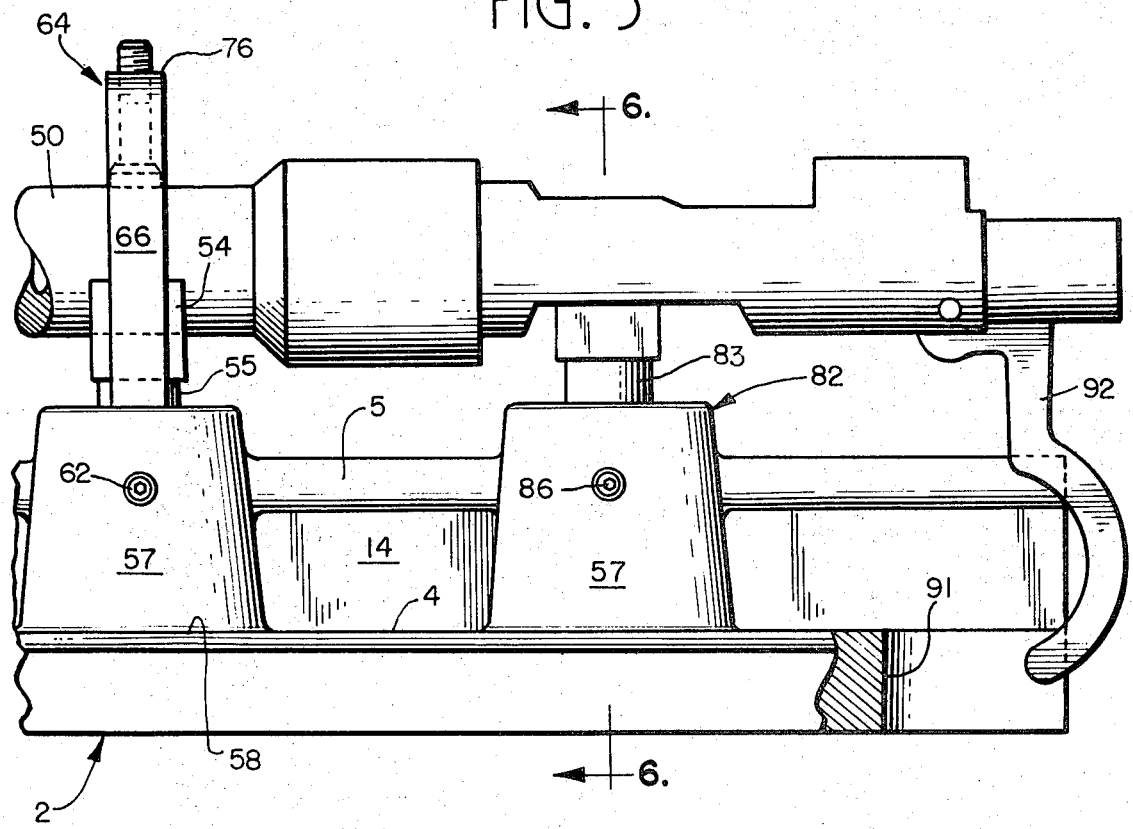
FIG. 5 is an enlarged fragmentary side elevational view.
Figure 6:
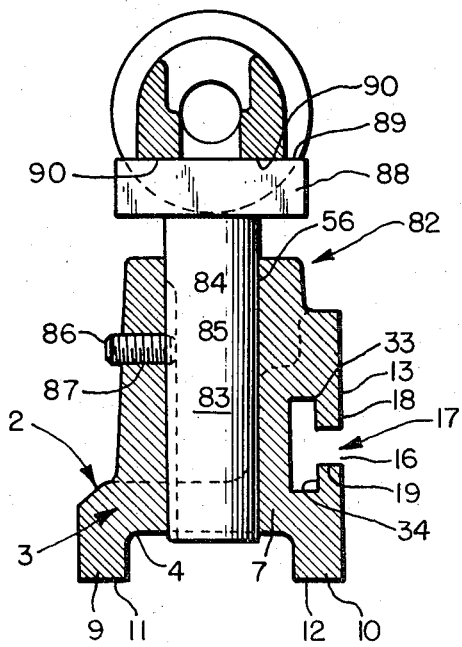
FIG. 6 is a vertical transverse sectional view taken substantially on line 6—6 of FIG. 5.

Describing the invention in detail and having particular reference to the drawings, there is shown a jig generally designated 2 which is made of metal and comprises a base 3 having a horizontal portion 4 and an integral vertical portion 5 along one edge of the horizontal portion 4.

The base comprises a horizontal web 7 and a pair of dependent legs 9 and 10 which have flat coplanar bottom seating edges 11 and 12.

The side wall portion 5 is a vertical continuation of the leg 10 and provides a flat vertical guide and mounting surface 13. The corner between the walls 5 and 7 is formed with a rectangular fillet 14 running the length of the walls 5 and 7 which thickens the lower portion of the wall 5 adjacent to the base and in which is formed a vertically disposed rectangular head portion 15 of a T-shaped slot 17, the leg 16 of which extends horizontally through the wall portion 5 and opens at the surface 13. The slot leg 16 is defined by upper and lower horizontal margins 18 and 19 which serve as accurate guides for a guide or key insert 20 being of rectangular form and being recessed at its outer end 21 within a complementary kerf 22 centered on horizontal bores 23 (only one of which is shown) in the lower portion 24 of the standard 25.

Each bore 23 admits a bolt 26 therethrough which extends through a coaxial and codimensional opening 28 in the insert 20. The inner end of the shank of bolt 26 is threaded as at 30 into a locking plate 31 which is a flat piece of metal dimensioned to fit into the head portion 15 of the T-slot, the plate 31 having an outer face 32 engaging the reentrant vertical surfaces 33, 34 above and below slot portion 16.

The bolt 26 has a head 35 which engages the flat external side 36 of the standard through a washer 37.

The standard 25 is a flat plate and has an upper portion 38 projecting above the upper edge 39 of the side wall 5 and has a plurality of laterally spaced dowels 40, 41 projecting inwardly from the inner side 42 of the standard or arm into complementary bores 43, 44 in an overarm plate or template 45 which has a flat side edge 46 which engages the inner side 42 of the standard, the standard and template being releasably interconnected by the bolts 47 which extends through openings 48 in the upper end of the standard into threaded bores 49 in the side edge 46 of the plate.

The plate 45 extends over the gun barrel 50 which is positioned lengthwise of the jig and at spaced areas has its cylindrical periphery nested within the downwardly converging surfaces 52, 53 of a V-block 54 formed on the upper end of a vertically disposed cylindrical support pin or post 55. The pin 55 fits into a complementary vertically disposed bore 56 in a boss 57 which is integrally formed on the upper side 58 of the base wall 7 and at one side merges into the fillet 14 and into the inner face 59 of wall 5 thus providing a strong, mutually reinforcing structure.

Each pin or post 55 has a vertical key slot 60 cut therein which admits the inner end 61 of a set screw 62 which is threaded normal thereto as at 63 through the related boss 57.

The barrel is held clamped in position to its associated V-block by an inverted U-shaped clamp 64 which has a pair of spaced legs 65, 66 which flank the barrel and fit at their inner sides 67, 68 against the opposed sides 69, 70 at opposite sides of the V-block. The lower ends of legs 65, 66 are formed with inturned hooks 71, 72 which underpose with respect to the V-block and have upper flat surfaces 73, 74 which complementally engage the underside 75 of the block. The bight portion 76 of each clamp joins the legs and is positioned over the barrel and has a threaded vertical aperture 77 which admits a threaded screw 78 therethrough, the upper end of which has an Allen wrench engaging aperture and the lower end has a ball connection 79 with a foot pad 80 which bears tangentially against the upper edge of the barrel.

Several of such clamp and support assemblies generally designated 81 are provided for clamping and positioning the barrel.

A feature of the present invention is the provision of a support pedestal assembly 82 which comprises a boss 57 with a vertical bore 56 receiving the post 83 which has a key slot 84 therein admitting the end 85 of an adjusting screw 86 which is threaded at 87 through the side of the associated boss 57.

The post 57 has at its upper end a seating pad 88 with a flat top surface 89 parallel with the base and providing a seat for the flat surfaces 90, 90 at the bottom of the action portion of the rifle barrel, said surfaces providing the reference area for positioning the barrel. These reference surfaces are available on each gun and I have discovered they provide an ideal reference for my jig. The base wall is cut out at 91 from one end to accommodate the trigger and guard 92.

The templates 45 are each of specific design for the rifle involved and comprise as, for example, in the present instance a pair of vertical apertures 93, 94 which have hardened cylindrical liner sleeves 95, 96 which guide the drill 97 and/or the tap 98 for drilling and threading the barrel in the appropriate location, as shown at 99 and 100, as measured from the ends of the barrel or otherwise for mounting the sight ramps or scopes on the barrel.

The adjustability of the V-blocks accommodates a tapered or stepped barrel as shown and the engagement of the legs 65, 66 at thin surfaces 67, 68 with surfaces 69, 70 insures that the locking screw 78 will be centered on the barrel and will not, in being tightened, throw the barrel askew.

I claim:

1. A gunsmith's jig comprising a base and a side portion, means providing a reference surface comprising a vertically adjustable pedestal mounted on said base adjacent one end thereof and including a flat, horizontal surface for mounting of flat, bottom reference surfaces of a gun barrel, means including vertically adjustable mounts on the base spaced longitudinally thereof for supporting and clamping the barrel thereto in a horizontal position, and a standard mounted to said side portion for adjustable positioning lengthwise of the barrel and having selective guide means extending over the barrel for guiding associated tool means for drilling and tapping the barrel.

2. The invention according to claim 1 and said base comprising a horizontal portion and a vertical portion integral with and extending upwardly from the horizontal portion, gusset means connecting said portions at the juncture thereof, and said mounts comprising bosses integral with said horizontal portion and merging at one side with said gusset and said upright portion, each said boss comprising a vertical bore therein, a post vertically adjustably secured in the bore, and a V-block integral with the upper end of the post and providing a cradle for the gun barrel.

3. The invention according to claim 2 and said mounting means further comprising vertical sides on said V-blocks at opposite sides thereof and a bottom horizontal surface normal to said sides, an inverted U-shaped clamp having a pair of upright legs flanking the gun barrel and in complementary engagement with respective vertical sides and having hook portions at their lower ends complementally engaging under said bottom horizontal surface, and having a bight portion interconnecting the legs above the gun barrel, and a tightenable holding screw assembly threaded through said bight portion and having a lower end engaging the top of the barrel.

4. The invention according to claim 3 and said base comprising a slot having a horizontally oriented leg extending into said upright portion, said upright portion providing a vertical surface normal to the horizontal portion, said standard having a vertical surface abutting said vertical surface on the upright portion, and guide means on the standard extending into said slot for positioning said standard upright in a plane parallel to said upright surfaces.

5. The invention according to claim 4, and said slot having a head portion vertically oriented widthwise within the juncture of the upright portion and the fillet, a retainer within the head portion slidable lengthwise of the base, and bolt means releasably securing the retainer to the standard.

6. The invention according to claim 5 and said selective guide means comprising templates having apertures aligned vertically with the barrel and removably secured to said standard at the upper end thereof.

7. The invention according to claim 1 and said base having a cut out slot at one end adjacent to said reference surface for accommodating a trigger and guard therein to permit movement of the barrel to a supported position on the mounts.

8. The invention according to claim 1 and each of said mounts comprising posts with V-blocks thereon, a vertical slot in each post, embossments on the base about each post, and screw means threaded through the embossments and extending into the slots in respective posts and tightened thereagainst, the screw means being positioned normal to said standard and parallel with said base for orienting the blocks in a disposition to locate the barrel parallel to said base and standard.

9. The invention according to claim 7 and said standard having a flat face, and said side portion having an upright flat face normal to said reference surface, said faces being in engagement with each other and said positioning said standard normal to said reference surface, said mounting means solely clamping the barrel and said reference surface solely seating the barrel and solely supporting the adjacent end of the barrel.

10. The invention according to claim 1 and said mounting and clamping means comprising V-blocks supporting the barrel and having side surfaces flanking the block, and an inverted U-clamp having side legs closely confining the block and engaging respective sides and said block having an underface, said legs having hooks engaging under the face, and a locking screw threaded in the clamp and centered between the legs and adapted to be screwed down to the barrel.

References Cited

UNITED STATES PATENTS

| | | |
|---|---|---|
| 810,319 | 1/1906 | Blazej. |
| 1,476,611 | 12/1923 | Hines. |
| 2,427,365 | 9/1947 | Meister. |

ROBERT C. RIORDON, Primary Examiner

D. D. EVENSON, Assistant Examiner

U.S. Cl. X.R.

269—87.3